No. 634,968. Patented Oct. 17, 1899.
G. M. VAN VALKENBURG.
CALIPER GAGE.
(Application filed June 8, 1899.)
(No Model.)
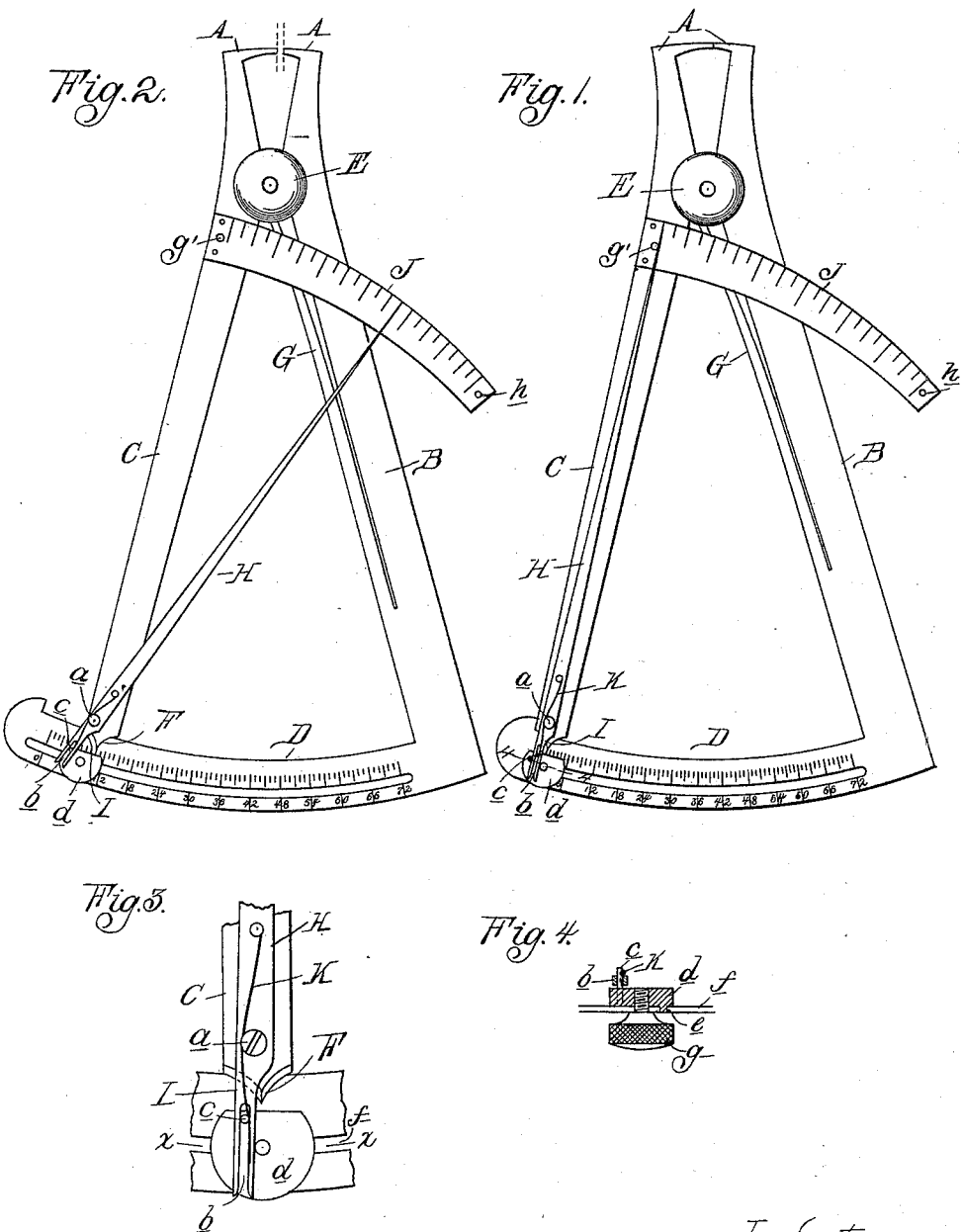
Witnesses:
F. M. Schowalter
V. D. Kinner
Inventor:
George M. Van Valkenburg
By Barthel & Barthel
Attorneys.

UNITED STATES PATENT OFFICE.

GEORGE M. VAN VALKENBURG, OF FOREST, CANADA.

CALIPER-GAGE.

SPECIFICATION forming part of Letters Patent No. 634,968, dated October 17, 1899.

Application filed June 8, 1899. Serial No. 719,776. (No model.)

*To all whom it may concern:*

Be it known that I, GEORGE M. VAN VALKENBURG, a subject of the Queen of Great Britain, residing at Forest, in the Province of Ontario, Canada, have invented certain new and useful Improvements in Caliper-Gages, of which the following is a specification, reference being had therein to the accompanying drawings.

This invention is particularly designed for watchmakers' use, and is of that class in which the distance apart between two caliper-jaws is indicated by a pointer upon a dial or sector, the graduation of which represents the conventional gage employed to express certain measurements.

The invention consists in the construction, arrangement, and operation of a compound pointer, whereby greater accuracy is obtained in determining the measurement or gage, all as more fully hereinafter described, and shown in the accompanying drawings, in which—

Figure 1 is a plan view of my improved gage. Fig. 2 is a like view showing the gage as in use. Fig. 3 is an enlarged portion of Fig. 1. Fig. 4 is a section on line 4 4, Fig. 1.

A and A are two caliper-jaws formed at the ends of the short arms of two levers pivotally secured together at E, so that the long arms B C thereof extend upon the same sides with their short arms.

D is a sector-gage secured to the end of the arm B, and F is a point on the arm C, whereby the latter forms the pointer-arm to indicate the gage or distance between the jaws upon the sector D, a spring G being interposed between the long arms of the levers, all arranged and constructed to operate in a well-known manner.

My improvement consists in pivotally securing at $a$ upon the pointer C a supplementary lever which has a long arm H, forming an amplifying-pointer, and a short arm I, which has a slot $b$, into which engages a guide-pin $c$. This guide-pin is adjustably secured upon the gage-sector D by means of a sliding block $d$, which at its under side has a guide-lug $e$ engaging into a slot $f$, formed in the sector, and a clamp-screw $g$, which has a knurled head, all so arranged that the sliding block may be moved in the slot and secured by the clamping-nut in any desired position.

The amplifying-pointer H points upon a sector J, which is secured to the pointer C, and has two stops $g'$ $h$, which limit the movement of the pointer H thereon.

K is a spring pressing with its free end against the guide-pin $c$ in such manner as to take up any lost motion which said pin may have in the slot $b$.

In practice it will be seen that by this construction the main pointer C can freely move on the sector D when the sliding block is unclamped, so that it can slide freely. In this condition the pointer C indicates the thickness of any article inserted between the caliper-jaws by the number of the gage indicated by it on the sector, as in the usual manner. When the sliding block $d$ is, however, clamped fast on the sector D, the movement of the pointer C imparts also movement to the amplifying-pointer H; but the movement of the former is limited by that of the latter, which must move through a larger arc of the circle. The sector J is also graduated to indicate gages correspondingly to the sector D, and as the graduation-marks are so much farther apart and can be subdivided they afford greater facility for reading and more accurate determination of the gage.

In the position shown in Fig. 1 the pointer C is at zero, and it can be moved from this position only as far as the pointer H can move on the sector J. For indicating the higher gages the block $d$ must be moved along in the slot.

To make the use of the instrument convenient through its whole range, I preferably mark the graduations on the sector D in groups corresponding to the range of the pointer H on the sector J. Thus, as shown in the drawings, if the sector J indicates six gages the sector D is divided off into groups of six gages. To indicate then, for instance, a gage between twelve and eighteen, the sliding block would have to be set so that the pointer C indicates "12," (which being a large graduation-mark can be done very accurately.) Then by clamping the block $d$ fast in this position the indications between "12" and "18" are shown by the pointer H on the sector J.

Of course the gage on the sector D may be provided only with division-marks for the groups, and the intermediate indications are then found by the pointer H. In the drawings the sector D is marked off to show a complete scale, and the pointer C indicates the gage at any position. The function of the pointer H is thus merely to amplify the indication of the pointer C upon the amplifying-sector J.

I claim—

1. A caliper-gage comprising in combination two levers pivotally secured together each having a short arm formed with a caliper-jaw and a long arm one of which has a sector-gage attached to its free end, and the other one of which forms a pointer for the same, a spring between the two long arms of said levers, a supplementary lever pivotally secured upon the aforesaid pointer and having a long arm substantially coextensive with the pointer and a short arm projecting beyond the free end of said pointer, means adjustably secured upon the aforesaid sector-gage with which said short arm slidingly engages, and a sector-gage secured upon the pointer and for which the long arm of the supplementary lever operates as a pointer.

2. A caliper-gage comprising in combination two levers pivotally secured together, one having a short arm with a caliper-jaw and a long arm to which a sector-gage is attached and the other having a short arm with a caliper-jaw and a long arm operating as a pointer for said sector-gage, and a supplementary lever pivotally secured upon said pointer and having a short arm provided with a slot and a long arm constituting an amplifying-pointer, a sector-gage for said amplifying-pointer, and a sliding block having means of adjustably securing it upon the first-named sector-gage and a pin thereon engaging into the slot of the supplementary lever.

3. In a caliper-gage of the character described, the combination with the pointer C and sector-gage D formed with a slot $f$, of the amplifying-pointer H pivotally secured upon the pointer C and having a short arm provided with a slot $b$, the sliding block $d$ adjustably in the slot $f$ of the sector-gage D, the pin $c$ on said sliding block engaging into the slot $b$, the spring K and the amplifying sector-gage J secured to the pointer C.

In testimony whereof I affix my signature in presence of two witnesses.

GEORGE M. VAN VALKENBURG.

Witnesses:
GEORGE W. HARVEY,
JAMES HANEY.